United States Patent
Park et al.

[11] Patent Number: 5,774,438
[45] Date of Patent: Jun. 30, 1998

[54] DATA WRITING DENSITY JUDGING APPARATUS AND METHOD

[75] Inventors: Chong Yeop Park; Chang Woo Nam, both of Seoul; Jong Jun Lee, Kyungki-Do, all of Rep. of Korea

[73] Assignee: LG Electronics, Inc., Seoul, Rep. of Korea

[21] Appl. No.: 550,652

[22] Filed: Oct. 31, 1995

[30] Foreign Application Priority Data

Nov. 1, 1994 [KR] Rep. of Korea .................. 1994/28521
Dec. 24, 1994 [KR] Rep. of Korea .................. 1994/36512
Dec. 24, 1994 [KR] Rep. of Korea .................. 1994/365213

[51] Int. Cl.[6] ...................................................... G11B 3/90
[52] U.S. Cl. .................... 369/54; 369/44.25; 369/44.28; 369/58
[58] Field of Search ................................. 369/47, 48, 50, 369/54, 58, 44.27, 44.28, 44.32, 44.25, 44.26

[56] References Cited

U.S. PATENT DOCUMENTS 4,577,301  3/1986  Mathews et al. ...................... 369/58 X
4,759,007  7/1988  Eberly ....................................... 369/58
5,276,664  1/1994  Shikunami ........................... 369/48 X Primary Examiner—Paul W. Huber

[57] ABSTRACT

An improved data writing density judging apparatus and method for a disc capable of judging a writing density of a disc by detecting an amount of cross talk or detecting a tracking error signal. Cross talk is detected when a disc track is scanned by a beam. A tracking error signal is detected when a pick-up member jumps a certain track while the pick-up member moves across a disc track. The improved apparatus and method computes a ratio between a minimum value and a maximum value of an envelope signal based on the detected amount of cross talk a writing density can be determined. The improved apparatus and method also converts a tracking error signal which is a high frequency analog signal into a digital signal that is used to compute a time required for a pick-up member to jump a certain track. Based on the computed time which is compared with a reference value, a writing density of a disk can also be determined.

10 Claims, 5 Drawing Sheets

5,774,438

DATA WRITING DENSITY JUDGING APPARATUS AND METHOD

BACKGROUND OF THE INVENTION

1. Field of the Invention

The present invention relates to a data writing density judging apparatus and method for a disc, and in particular to an improved data writing density judging apparatus and method for a disc capable of judging a writing density of a disc by detecting an amount of cross talk which occurs when a disc track is scanned by a beam and by detecting a tracking error signal.

2. Description of the Conventional Art

Generally, the amount of data to be written on a disc of a disc reproducing apparatus is subjected to a writing density of a disc. In addition, the writing density of a disc is measured by a track pitch and a unit pit with respect to a disc track. Thus, to increase the writing density of a disc, shortening the length of a unit pit or narrowing the track pitch is necessary.

However, because of the demand for writing more data has increased a high density disc is necessary in the industry. In case of the reproducing apparatus adopting a low density disc, an additional apparatus is necessary for the high density disc to reduce the cost for a new reproducing apparatus for a high density disc.

Therefore, the disc reproducing apparatus needs a specific method of judging whether a high density disc or a low density disc is used.

The conventional method of judging the type of a data writing density of a disc includes an identification data (ID) code indicating a corresponding writing density in a data format of a disc. However, in this case, since there is a different density between a high density disc and a low density disc, the rotation ratio differs from each other, thus, disadvantageously increasing a time consumption to read an ID code. Also, the ID format between the high density disc and the low density disc should be disadvantageously the same.

SUMMARY OF THE INVENTION

Accordingly, it is an object of the present invention to provide a data writing density judging apparatus and method for a disc, which overcome the problems encountered in conventional data writing density judging for a disc.

It is another object of the present invention to provide an improved data writing density judging apparatus and method for a disc capable of judging a writing density of a disc by detecting the amount of cross talk which occurs when a disc track is scanned by a beam and by detecting a tracking error signal.

To achieve the above objects, in accordance with a first embodiment of the present invention, there is provided a data writing density judging method for a disc, which includes the steps of a signal detection step which detects the amount of cross talk and a tracking error signal of a high frequency analog signal which occurs while a pick-up member begins jumping a certain track and finishes the jump as the pick-up member moves across a disc track when the disc track is scanned by a beam; a comparison value computation step which computes the maximum value and the minimum value of a develop from the analog signal which detected the amount of the cross talk, converts a tracking error signal of an analog signal into a digital signal, and computes the time required while a pick-up member jumps a certain track and finishes the jump and the maximum value thereof; and a writing density judging step which compares the thusly computed operation value and the thusly computed comparison value with a reference value, respectively and judging a writing density, thus more easily judging a writing density of a disc and advantageously reducing a writing density judging time by detecting the amount of cross talk and a tracking error signal of an analog signal when a disc track is scanned by a beam, detecting a ratio of a minimum value with respect to the maximum value of a develop in the thusly detected analog signal, the maximum value, and a cycle, and judging a writing density of a disc by comparing the thusly detected values with a reference value.

DETAILED DESCRIPTION OF THE INVENTION

Figure 1:
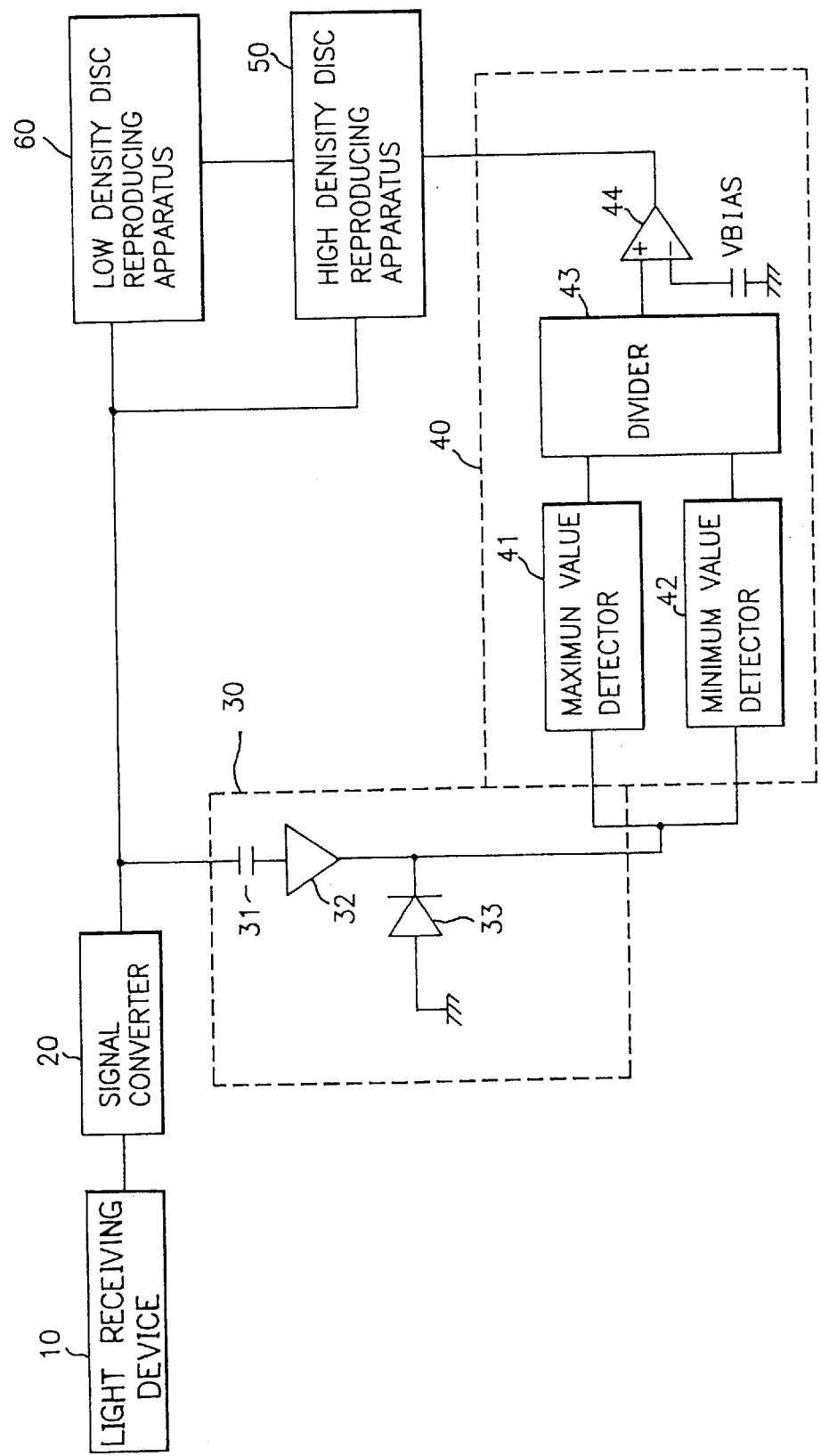
FIG. 1 is a block diagram of a data writing density judging method for a disc of a first embodiment according to the present invention.

Referring to FIG. 1, a data writing density judging apparatus and method for a disc of a first embodiment according to the present invention includes a light receiving device 10 for receiving a light reflected by a track due to a cross talk phenomenon when a disc track is scanned by a laser beam, a signal converter 20 for converting the output of the light receiving device 10 into an analog signal of a high frequency RF, an envelope detector 30 for detecting an envelope by receiving a high frequency analog signal from the signal convertor 20, a writing density judging circuit 40 for computing a ratio between a minimum value with respect to a maximum value of the envelope detected by the envelope detector 30, comparing the thusly computed ratio value with a reference value, and judging a writing density of a disc, based on the computed ratio value and a high density disc reproducing apparatus 50 and a low density reproducing apparatus 60 for executing a reproducing operation by receiving an output of the signal convertor 20 in accordance with an output signal of the writing density judging circuit 40.

The envelope detector 30 includes a capacitor 31 for coupling a direct current (DC) component from a high frequency (RF) analog signal outputted from the signal convertor 20, a buffer 32 for buffering the output signal of the capacitance 31, and a diode 33 for half-rectifying the output signal of the buffer 32 and for detecting an envelope of the high frequency analog signal.

The writing density judging circuit 40 includes the maximum value detector 41 and the minimum value detector 42 for detecting the maximum value and the minimum value of the envelope, respectively, by receiving an envelope of a high frequency (RF) analog signal outputted from the envelope detector 30, a divider 43 for computing a ratio of the minimum value with respect to the maximum value by receiving the output of the maximum value detector 41 and the maximum value detector 42, respectively, and a comparator 44 for judging the writing density by receiving the output of the divider 43 through a non-inverting terminal and a reference voltage Vbias from an inverting terminal.

The operation of the data writing density judging apparatus and method for a disc of a first embodiment according to the present invention will now be explained with reference to FIGS. 1, 2A–2B and 3A–3B.

To begin with, when a user turns on a power switch and inserts a disc into a cartridge, the microcomputer recognizes the insertion of the disc and drives a corresponding element.

Therefore, a pick-up member moves to an initial position of a disc by a pick-up member servo (not shown), and a focussing operation is executed with respect to the reflection surface of the disc by the focussing servo, and the laser output servo (not shown) is driven, and a disc track is scanned by a laser beam through an objective lens (not shown).

Thereafter, when the pick-up member moves across the tracks, and a disc track is scanned by a laser beam, a cross talk phenomenon occurs, which is a phenomenon due to signal current leaks on a mirror surface adjacent to a pit surface. Here, the cross talk phenomenon increases as the pick-up member approaching the mirror surface.

Therefore, the light receiving device 10 receives a laser beam reflected from the track of a disc due to the cross talk phenomenon and outputs the beam to the signal convertor 20. The signal convertor 20 converts the output of the light receiving device 10 into an analog signal.

Figure 2A:
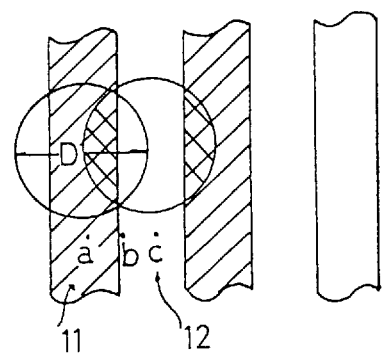
FIG. 2A is a view of an operation of focussing a high density disc using a pick-up member according to the present invention.
Figure 2B:
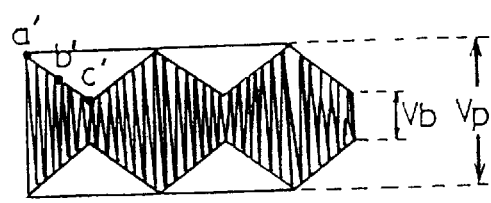
FIG. 2B is a wave form of an analog signal of a high frequency of FIG. 2A.

That is, as shown in FIG. 2A, in case of focussing a high density disc, using a pick-up member, having a narrow track pitch with a predetermined diameter D, when the pick-up moves across the track, the beam scanned across the pit surface 11 of the track and reflected from the pit surface 11 is converted into a high frequency analog signal having a specific wave form shown in FIG. 2B by the converter 20. Here, points a, b, and c correspond to points a', b', and c'.

Figure 3A:
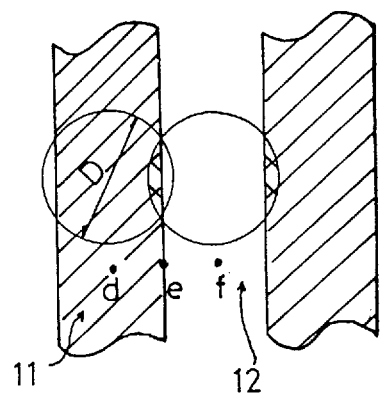
FIG. 3A is a view of an operation of focussing a low density disc using a pick-up member according to the present invention.
Figure 3B:
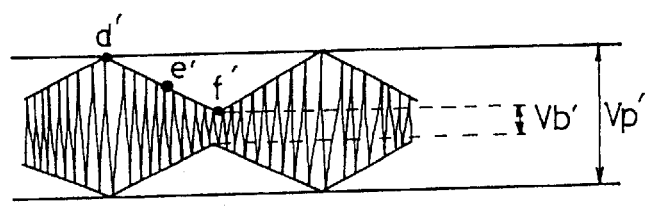
FIG. 3B is a wave form of an analog signal of a low frequency of FIG. 3A.

Meanwhile, in case of focussing a low density disc, using a pick-up member, having a wide track pitch as shown in FIG. 3A, the beam scanned across the pit surface 11 of the track and reflected from the pit surface 11 is converted into a high frequency analog signal having a specific wave form shown in FIG. 3B by the converter 20. Here, points d, e, and f correspond to points d', e', and f', respectively.

At this time, the size of the high frequency analog signal is largest when the points a and d are scanned by a beam. In addition, at the points b and e, that is, the beam approaches the mirror surface 12, the size thereof is intermediate, and when the points c and f are scanned by a beam, the size thereof is smallest.

Thereafter, the high frequency (RF) analog signal inputted to the envelope detector 30 is coupled by the capacitor 31 and buffered by the buffer 32, half-rectified by the diode 33 and outputted to the writing density judging circuit 40 in a high frequency (RF) analog signal form.

The maximum value detector 41 and the minimum value detector 42 of the writing density judging circuit 40 detect the maximum value and the minimum value from the envelope of the high frequency (RF) analog signal and output to the divider 43. The divider 43 computes a ratio value of a minimum value with respect to the maximum value of the envelope and outputs to the comparator 44. The comparator 44 compares the output value of the divider 43 with a reference voltage Vbias outputted from the non-inverting terminal thereof and outputs a writing density judging signal of a disc.

That is, as shown in FIG. 2B, in case of focussing a high density disc using a pick-up member, since the ratio Vp/Vb of a minimum value with respect to the maximum value of a high frequency (RF) analog signal is greater than the ratio Vp'/Vb' of a minimum valtie with respect to the maximum value of a high frequency (RF) analog signal outputted in case of focussing a low density disc using a pick-up member as shown in FIG. 3B, the comparator 44 of the writing density judging circuit 40 compares the ratios Vp/Vb and Vp'/Vb' of a minimum value with respect to the maximum value of a high frequency (RF) analog signal and outputs a writing density judging signal of a disc.

Therefore, the high density disc reproducing apparatus 50 enables a reproducing system corresponding to a high density disc when a writing density judging signal of a high level is outputted from the writing density judging circuit 40 and executes a reproducing operation by receiving a high frequency (RF) analog signal outputted from the signal converter 20. The low density disc reproducing apparatus 60 enables a reproducing system to run, corresponding to a low density disc when a writing density judging signal of a low level is outputted from the writing density judging circuit 40 and executes a reproducing operation by receiving a high frequency (RF) analog signal outputted from the signal convertor 20.

Figure 4:
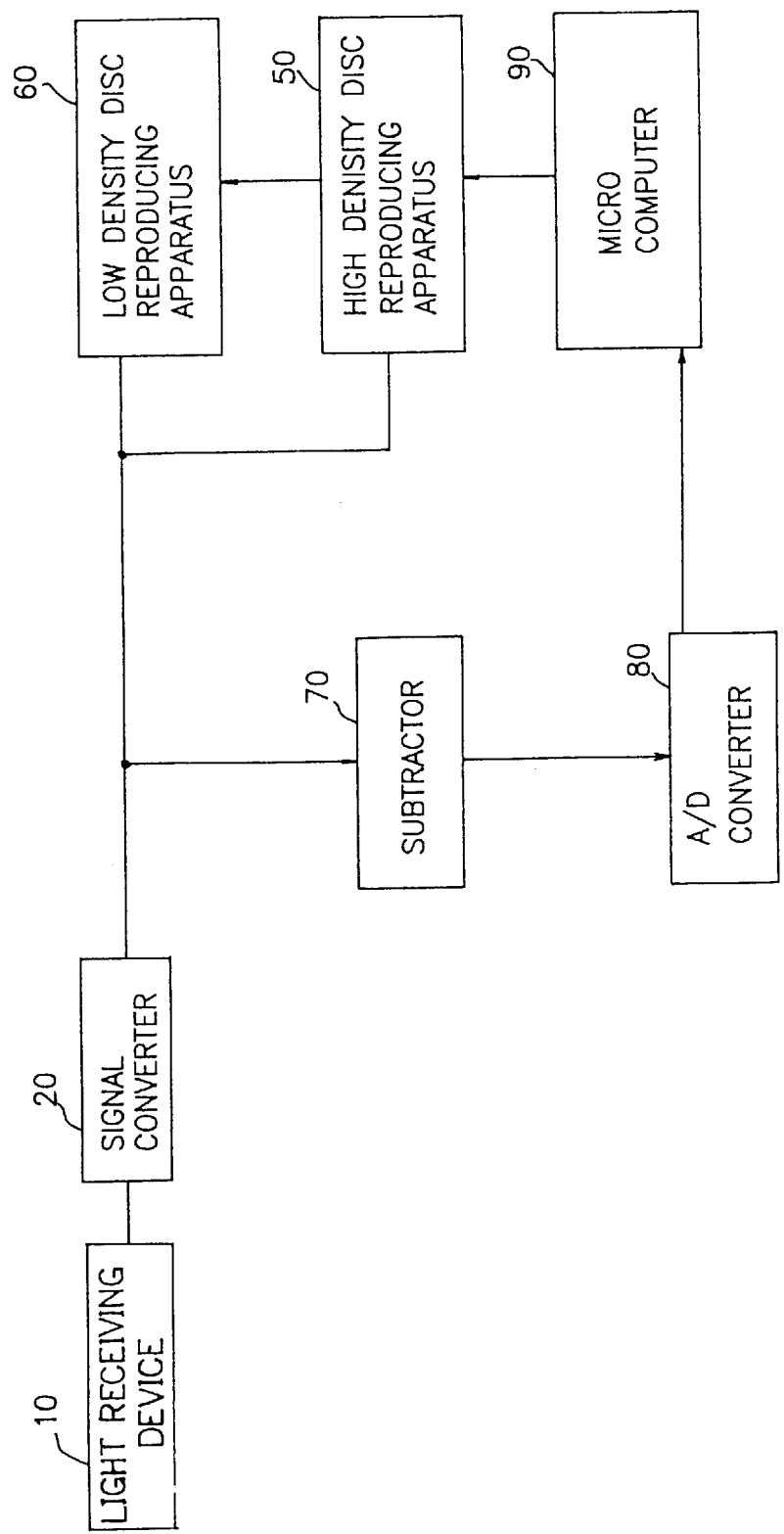
FIG. 4 is a block diagram of a data writing density judging method for a disc of a second embodiment according to the present invention.

In addition, FIG. 4 shows a construction of a writing density judging apparatus and method for a disc of a second embodiment according to the present invention. The second embodiment includes the same element as the first embodiment of the present invention except a subtractor 70, an A/D convertor 80, and a microcomputer 90 instead of adopting the envelope detector 30 and the writing density judging circuit 40 of the first embodiment.

The operation of a data writing density judging apparatus and method for a disc will now be explained with reference to FIGS. 5A–5B, 6A–6B and 7A–7B.

To begin with, when a user turns on a power switch and inserts a disc into a cartridge, the microcomputer 90 recognizes the insertion of the disc and drives a corresponding servo system in accordance with a previously set program.

Therefore, a pick-up member moves to an initial position of a disc by a pick-up member servo (not shown), and a focussing operation is executed with respect to the reflection surface of the disc by the focussing servo, and the laser output servo (not shown) is driven, and a sub-beam for a main beam and a tracking error detection scans across the disc track surface of the disc.

Thereafter, the light receiving device 10 receives a sub-beam and a main beam for a tracking error detection, which are deflected by the track of the disc and outputs to the signal convertor 20. The signal convertor 20 receives the output value of the light receiving device 10 and outputs a high frequency (RF) analog signal.

Figure 5A:
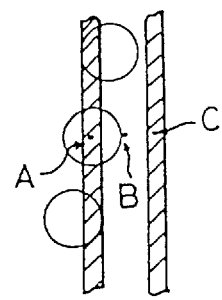
FIG. 5A is a view of an operation of focussing a high density disc using a pick-up member according to the present invention.
Figure 5B:
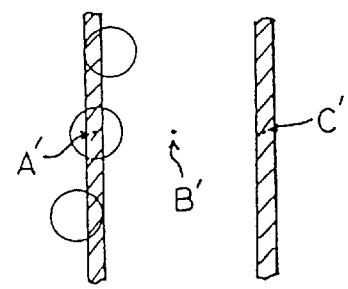
FIG. 5B is a view of an operation of focusing a low density disc using a pick-up member according to the present invention.

That is, as shown in FIGS. 5A and 5B, as a disc track having different track pitches by a sub-beam is scanned, and a pick-up member moves across the track, the sub-beam for a tracking error detection deflected by track surfaces A and C and mirror surface B, respectively, are converted into a high reference (RF) analog signal by the light receiving device 20 and the signal convertor 20.

Figure 6A:
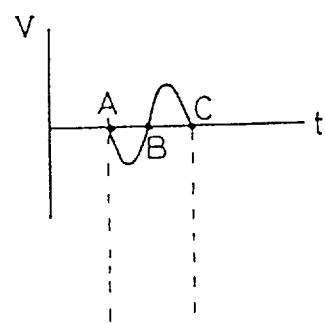
FIG. 6A is a wave form of a tracking signal detected in a high frequency analog signal form of FIG. 5A.
Figure 6B:
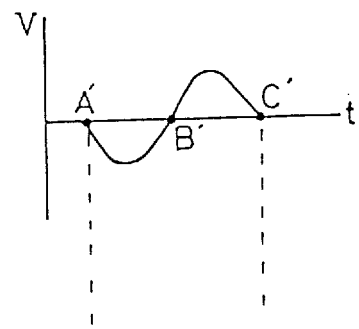
FIG. 6B is a wave form of a tracking signal detected in a low frequency analog signal form of FIG. 5B.

Thereafter, the subtractor 70 is capable of receiving two sub-beams for a tracking error detection outputted from the signal convertor 20 and subtracts two analog signals and outputs an analog signal having different high frequencies, that is, a tracking error signal shown in FIGS. 6A and 6B. The A/D convertor 80 receives the tracking error signal and converts into a certain form of a signal shown in FIGS. 7A and 7B.

Figure 7A:
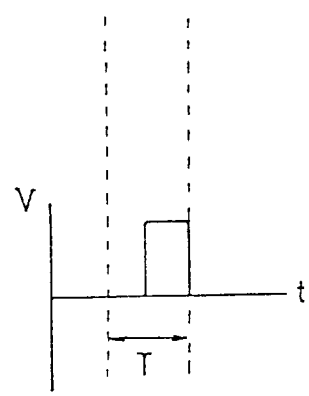
FIG. 7A is a wave form of a digital signal converted from a tracking error signal of a high density analog signal of FIG. 6A according to the present invention.
Figure 7B:
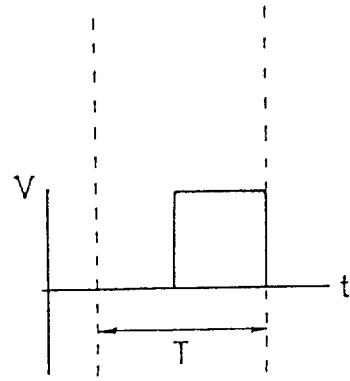
FIG. 7B is a wave form of a digital signal converted from a tracking error signal of a low density analog signal of FIG. 6B according to the present invention.

Thereafter, the microcomputer 90 receives the thusly converted tracking error signal and computes one cycle time (pulse width), compares the resultant value with a reference value, and judges a writing density of a disc. As shown in FIGS. 7A and 7B, since the time T while one track jump in a high density disc is completed from its beginning is smaller than the time T' while one track jump in a low density disc is completed from its beginning, the microcomputer 90 compares the time (pulse width) for one cycle with a reference value, judges the writing density of a disc and outputs a control signal.

In addition, the microcomputer 90 receives a tracking error signal converted by the A/D converter 80, computes a value at the maximum value of the pulse and an integration value of a rectangular pulse, compares the, thusly, computed value with a reference value, and judges a writing density of a disc.

That is, as shown in FIGS. 7A and 7B, since the maximum value of a tracking error signal outputted in a rectangular form while one track jump is completed from its beginning, in a high density disc is smaller than the maximum value of a tracking error signal or an integration value while one tack jump is completed from its beginning in a low density disc, the microcomputer 90 compares the maximum value of a rectangular form pulse or the integration value with a reference value, judges a writing density disc, and outputs a control signal.

Therefore, the high density disc reproducing apparatus 50 or the low density disc reproducing apparatus 60 receives an analog signal of a high frequency (RF) outputted from the signal converter 2 in accordance with a driving signal outputted from the microcomputer 90 and executes a reproducing operation corresponding to the disc writing density.

As described above, a data writing density judging method for a disc is directed to more easily judging a writing density of a disc and advantageously reducing a writing density judging time by detecting the amount of cross talk and a tracking error signal of an analog signal when a disc track is scanned by a beam, detecting a ratio of a minimum value with respect to the maximum value of a develop in the thusly detected analog signal, the maximum value, and a cycle, and judging a writing density of a disc by comparing the thusly detected values with a reference value.

What is claimed is:

1. A data writing density judging method for reproducing a disc, comprising the steps of:

detecting a high frequency analog signal which indicates an amount of cross talk generated when a beam is scanned while a pickup moves in a traversing direction to a disc track after a focusing servo operation;

obtaining a minimum value and a maximum value of the high frequency analog signal;

obtaining a ratio value from the minimum and maximum values;

comparing the ratio value with a predetermined standard value; and determining a data writing density of the disc based on the comparison result.

2. The method according to claim 1, wherein the ratio value is calculated by dividing the minimum value with respect to the maximum value.

3. The method according to claim 1, wherein the data writing density is one of a low density and a high density.

4. The method according to claim 1, wherein the predetermined standard value is a reference voltage value.

5. A data writing density judging method for reproducing a disc, comprising the steps of:

detecting a tracking error signal of a digital waveform generated when a beam is scanned while a pickup moves in a traversing direction to a disc track after a focusing servo operation;

determining a track movement time of a predetermined region from the tracking error signal;

comparing the track movement time with a predetermined standard value; and determining a data writing density of the disc based on the comparison result.

6. The method according to claim 5, wherein the step of determining a track movement time, further includes the steps of:

converting the tracking error signal into a digital waveform;

determining a period of the digital waveform; and determining the track movement time based on the determined period.

7. The method according to claim 5, wherein the step of determining the track movement time includes the step of:

computing a pulse width time of a cycle.

8. A data writing density judging method for reproducing a disc, comprising the steps of:

detecting a tracking error signal of a digital waveform generated when a beam is scanned while a pickup moves in a traversing direction to a disc track after a focusing servo operation;

determining a peak value and an integrated value of the tracking error signal;

comparing one value of the peak value and the integrated value with a predetermined standard value; and determining a data writing density of the disc based on the comparison result.

9. The method according to claim 8, wherein the step of determining the peak value and the integrated value, further includes the steps of:

converting the tracking error signal to a digital waveform; and obtaining a peak value and an integrated value of the digital waveform.

10. The apparatus of claim 8, wherein the writing density of the disc is one of a low density and a high density.

* * * * *

UNITED STATES PATENT AND TRADEMARK OFFICE
CERTIFICATE OF CORRECTION

| | | |
|---|---|---|
| PATENT NO. | : 5,774,438 | Page 1 of 1 |
| APPLICATION NO. | : 08/550652 | |
| DATED | : June 30, 1998 | |
| INVENTOR(S) | : Chong Y. Park | |

It is certified that error appears in the above-identified patent and that said Letters Patent is hereby corrected as shown below:

Title Page item 30, line 3 Should read

1) "KR94-365213" should be "KR94-36513".

Signed and Sealed this

Thirty-first Day of March, 2009

JOHN DOLL
*Acting Director of the United States Patent and Trademark Office*

UNITED STATES PATENT AND TRADEMARK OFFICE
CERTIFICATE OF CORRECTION

PATENT NO.        : 5,774,438
APPLICATION NO.   : 08/550652
DATED             : June 30, 1998
INVENTOR(S)       : Chong Yeop Park et al.

Page 1 of 1

It is certified that error appears in the above-identified patent and that said Letters Patent is hereby corrected as shown below:

Title Page

Line 3 under [30] Foreign Application Priority Data on the first page reads "Dec. 24, 1994 [KR] Rep. of Korea ....... 1994/365213" and should instead read "Dec. 24, 1994 [KR] Rep. of Korea ....... 1994/36513".

Signed and Sealed this

Thirtieth Day of June, 2009

JOHN DOLL
*Acting Director of the United States Patent and Trademark Office*